US011558668B2

(12) United States Patent
Aouina et al.

(10) Patent No.: US 11,558,668 B2
(45) Date of Patent: Jan. 17, 2023

(54) MEASURING VIDEO QUALITY OF EXPERIENCE BASED ON DECODED FRAME RATE

(71) Applicant: Microsoft Technology Licensing, LLC, Redmond, WA (US)

(72) Inventors: Zied Aouina, Redmond, WA (US); Stefan Francis Slivinski, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/338,068

(22) Filed: Jun. 3, 2021

(65) Prior Publication Data

US 2022/0394332 A1    Dec. 8, 2022

(51) Int. Cl.
 *H04N 21/4425* (2011.01)
 *H04N 21/6379* (2011.01)
 *H04N 19/154* (2014.01)

(52) U.S. Cl.
 CPC ....... *H04N 21/4425* (2013.01); *H04N 19/154* (2014.11); *H04N 21/6379* (2013.01)

(58) Field of Classification Search
 CPC ........... H04N 21/4425; H04N 21/6379; H04N 19/154
 See application file for complete search history.

(56) References Cited

U.S. PATENT DOCUMENTS

| | | | |
|---|---|---|---|
| 8,385,221 B2 | 2/2013 | Chetlur et al. | |
| 8,789,081 B2 | 7/2014 | Parker et al. | |
| 9,277,208 B2 | 3/2016 | Wang et al. | |
| 10,003,847 B2 | 6/2018 | Lewis et al. | |
| 10,182,097 B2 | 1/2019 | Bovik et al. | |
| 10,673,921 B2 | 6/2020 | Wang et al. | |
| 10,869,072 B2 | 12/2020 | Yamagishi | |
| 2010/0128130 A1* | 5/2010 | Howcroft | H04N 21/6582 348/180 |
| 2012/0117225 A1* | 5/2012 | Kordasiewicz | H04N 21/44004 709/224 |

(Continued)

FOREIGN PATENT DOCUMENTS

| | | | | |
|---|---|---|---|---|
| CA | 2742038 C | * | 1/2019 | |
| CN | 110519633 A | * | 11/2019 | ....... H04N 21/41407 |

(Continued)

OTHER PUBLICATIONS

"How Akamai Defines and Measures Online Video Quality", In White Paper of Akamai, Retrieved Date: Apr. 13, 2021, 6 Pages.

(Continued)

*Primary Examiner* — James R Sheleheda
(74) *Attorney, Agent, or Firm* — Klarquist Sparkman, LLP

(57) ABSTRACT

Techniques are described for determining quality of experience (QoE) rate information for streaming video. For example, QoE rates can be calculated by a client while receiving and decoding an encoded video stream. The QoE rates can be calculated based on the number of video stalls that occur at the client while decoding the encoded video stream during a plurality of time periods. Determining (Continued)

whether a video stall occurs during a given time period involves comparing an encoded frame rate to a decoded frame rate. Indications of the QoE rates can be output.

19 Claims, 7 Drawing Sheets

(56)  References Cited

U.S. PATENT DOCUMENTS

| | | | | |
|---|---|---|---|---|
| 2013/0304934 | A1* | 11/2013 | Joch | H04L 69/14 709/231 |
| 2014/0139687 | A1* | 5/2014 | Adams | H04L 43/0894 348/192 |
| 2015/0271231 | A1* | 9/2015 | Luby | H04L 47/26 709/231 |
| 2015/0326455 | A1* | 11/2015 | Hui | H04L 43/045 715/736 |
| 2016/0286427 | A1* | 9/2016 | Chakraborty | H04M 1/2535 |
| 2019/0158564 | A1 | 5/2019 | Wang et al. | |
| 2019/0184284 | A1* | 6/2019 | Quere | A63F 13/358 |
| 2021/0120292 | A1* | 4/2021 | Liu | H04N 21/2402 |
| 2022/0124141 | A1* | 4/2022 | Ramanujam | H04L 43/065 |

FOREIGN PATENT DOCUMENTS

| | | | | |
|---|---|---|---|---|
| CN | 114189700 A | * | 3/2022 | |
| EP | 2530870 B1 | * | 9/2015 | H04L 41/5067 |
| EP | 3261292 A1 | * | 12/2017 | G06N 20/00 |
| EP | 3633933 A1 | * | 4/2020 | H04L 43/028 |
| WO | 2013029214 A1 | | 3/2013 | |
| WO | 2014066975 A1 | | 5/2014 | |

OTHER PUBLICATIONS

Aggarwal, et al., "Prometheus: Toward Quality-of-Experience Estimation for Mobile Apps from Passive Network Measurements", In Proceedings of the 15th Workshop on Mobile Computing Systems and Applications, Feb. 26, 2014, 6 Pages.

Dimopoulos, et al., "Measuring Video QoE from Encrypted Traffic", In Proceedings of the Internet Measurement Conference, Nov. 14, 2016, pp. 513-526.

"International Search Report and Written Opinion Issued in PCT Application No. PCT/US22/028410", dated Jul. 14, 2022, 12 Pages.

* cited by examiner

MEASURING VIDEO QUALITY OF EXPERIENCE BASED ON DECODED FRAME RATE

BACKGROUND

Providing a high-quality video streaming experience is important for many organizations, from organizations that provide live streaming solutions (e.g., live video game streaming services) to video-on-demand solutions. In typical large-scale video streaming solutions, a given video stream may be streamed to hundreds or thousands of clients simultaneously. Understanding the playback quality that the clients are experiencing can be important.

There are many factors that determine the quality of the playback experience at a video streaming client. For example, there can be issues with video content encoding, video stream transcoding, video content distribution, network bandwidth, and computing resource utilization at the client just to name a few. Similarly, there are many ways to measure the quality of the playback experience at the video streaming client. In some solutions, packet loss is used to measure the playback experience at the client. However, packet loss may not accurately reflect playback experience because packet loss is not necessarily related to what the user sees on the display (e.g., video frames may still be decoded and displayed). Similar issues are present with other solutions for measuring quality, such as decoder buffer fullness.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for determining quality of experience (QoE) rates during video decoding. For example, operations can be performed for receiving an encoded video stream comprising video content encoded according to a video coding specification. Operations can be performed for each of a plurality of time periods during decoding of the encoded video stream, including: obtaining an encoded frame rate of the encoded video stream, obtaining a decoded frame rate from decoding the encoded video stream during the time period, and determining whether there is a video stall during the time period based at least in part on the encoded frame rate in comparison to the decoded frame rate. A QoE rate can be calculated based at least in part on how many video stalls are determined over the plurality of time periods. An indication of the QoE rate can be output.

As another example, technologies are described for receiving indications of QoE rates calculated during video decoding. For example, operations can be performed for each of a plurality of playback intervals during streaming of an encoded video stream. The operations can comprise receiving, from each of a plurality of client devices, an indication of a QoE rate for the playback interval indicating playback quality from decoding the encoded video stream at the client device, where the QoE rate is calculated at the client device based on how many video stalls occur at the client device during decoding, and where a video stall is determined based at least in part on a difference between an encoded frame rate of the encoded video stream and a decoded frame rate generated by a decoder during decoding the encoded video stream at the client device. The indications of the QoE rates received from each of the plurality of client devices can be stored. Automated adjustment of the streaming of the encoded video stream can be initiated based at least in part on the indications of the QoE rates.

DETAILED DESCRIPTION

Overview

Figure 1:
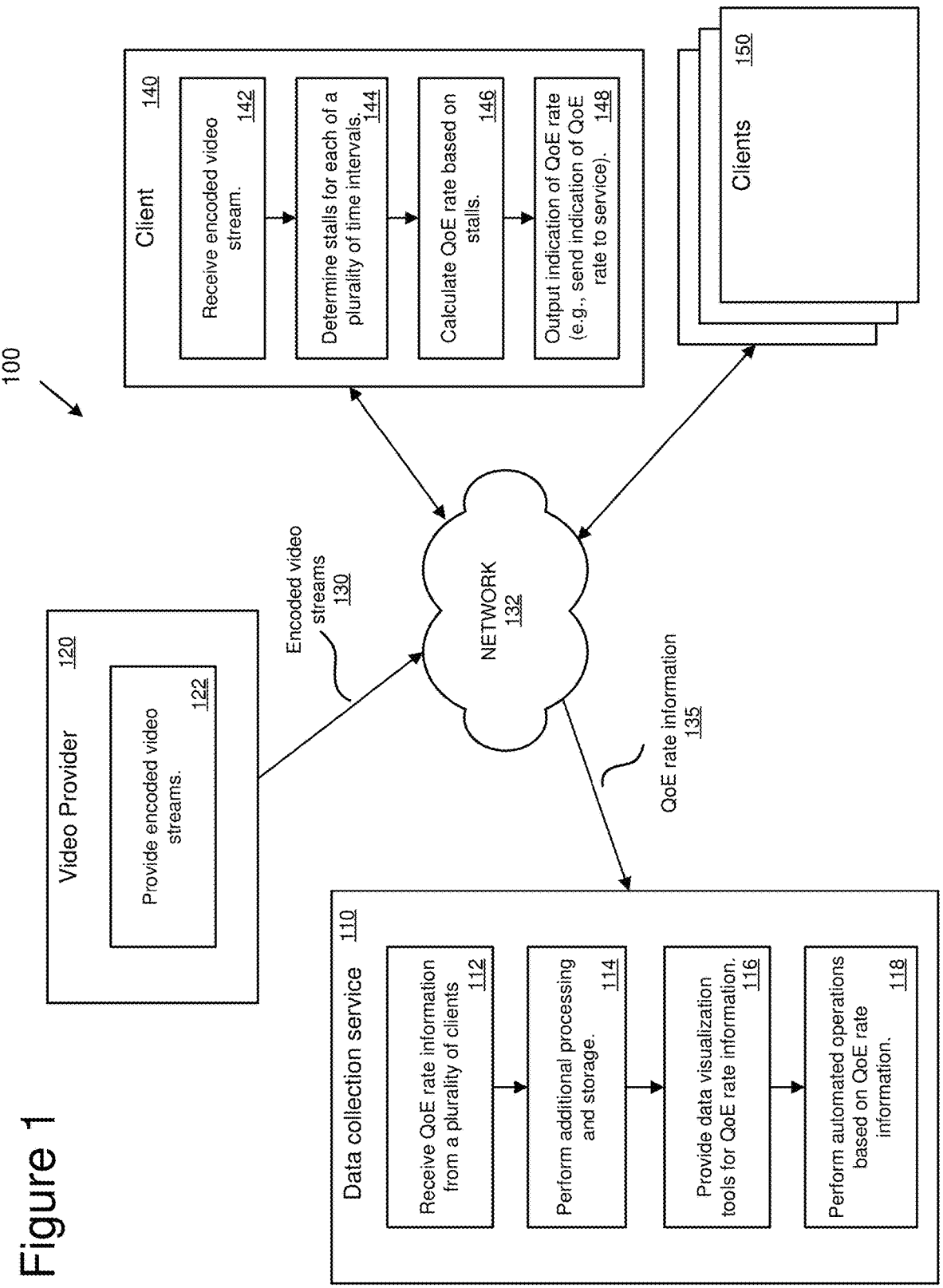
FIG. 1 is a block diagram depicting example environment for evaluating video quality of experience (QoE) based on video frame rates.

As described herein, various techniques and solutions can be applied to determining quality of experience (QoE) rate information for streaming video. For example, QoE rates can be calculated by a client while receiving and decoding an encoded video stream. The QoE rates can be calculated based on the number of video stalls that occur at the client while decoding the encoded video stream during a plurality of time periods. Determining whether a video stall occurs during a given time period involves comparing an encoded frame rate to a decoded frame rate. Indications of the QoE rates can be output (e.g., sent to a data collection service).

Indications of QoE rates can be received by a service (e.g., a data collection service) from a number of clients. The service can store the indications of the QoE rates and perform further processing and/or analysis. For example, the service can determine playback experience categories for the QoE rates. The service can also provide data analysis and visualization tools (e.g., to view overall trends in the playback quality at the clients). The service can also initiate automated actions to correct issues based on the QoE rates (e.g., restart servers or components associated with the video streaming).

The technologies described herein for determining video quality of experience based on frame rates provide various advantages. One advantage is that the technologies can be implemented regardless of the streaming protocol being used (i.e., determining QoE rates is streaming protocol independent). For example, QoE rates can be determined for video streams provided using Web Real-Time Communication (WebRTC, which is an open-source project), HTTP Live Streaming (HLS, which is a communication protocol developed by Apple®), and/or using other streaming protocols. Another advantage is that the technologies can be implemented regardless of the video decoder (or video codec) being used. Another advantage is that QoE rate information can be determined using only frame rates (i.e., not using any other parameters associated with streaming or decoding, such as packet loss information, decoder buffer fullness, etc.). In addition, the technologies can be implemented efficiently by using fewer computing resources. For example, clients can perform calculations efficiently using only frame rates (e.g., calculate stalls and QoE rates for various playback intervals).

Quality of Experience

In the technologies described herein, the video playback experience is measured using a new quality of experience technique. The new technique uses only frame rate measurements (e.g., instead of other measures, such as packet loss or decoder buffer fullness) and thus provides a more accurate and efficient way of measuring quality of experience.

Once streaming video begins playing, the human eye is sensitive to lags and stalls. A video stall occurs when a number of consecutive video frames have been dropped, resulting in a freeze during video decoding and/or playback. A stall can be caused by a variety of conditions, including source lagging, network issues causing packet loss, playback hardware issues (e.g., causing an inability to decode in real time), and/or other issues that affect the ability of the video processing component (e.g., decoder, transcoder, etc.) to process video frames at the encoded frame rate.

Using video stall statistics, various quality of experience metrics can be determined for various time periods. The quality of experience metrics indicate the playback quality experienced by the user when viewing playback of the streaming video content. For example, if there are a high number of video stalls, then the user will see the video freeze during playback.

Calculating QoE Rates

In the technologies described herein, QoE rates are calculated based at least in part on frame rates. In some implementations, the only decoding statistics used in calculating the QoE rates are the video frame rates.

To calculate the QoE rate, the encoded frame rate and the decoded frame rate are obtained for a given period of time. The encoded frame rate refers to the frame rate at which the streaming video content was encoded (e.g., at the server, video source, or transcoder). The encoded frame rate is also referred to as the source frame rate or the target frame rate.

In some situations, the encoded frame rate is available from the encoded video bitstream (e.g., it is provided as a bitstream parameter). In some situations, the encoded frame rate is determined in another way (e.g., determined by decoding an initial period of streaming video frames and using the frame rate from that initial period as the encoded frame rate).

The decoded frame rate refers to the frame rate provided by the video decoder. In other words, the decoded frame rate is the frame rate after the encoded video stream has been decoded. In some implementations, the decoder provides the decoded frame rate. For example, a web browser (implementing a video decoder) can provide the decoded frame rate (e.g., in terms of frames-per-second (fps)) after the encoded video stream has been decoded. The decoded frame rate is not the same as the displayed frame rate or the rendering frame rate. For example, a 60 fps video stream can still have a displayed and/or rendering frame rate of 60 fps even when the decoded frame rate is lower (e.g., 42 fps).

However, the user will notice the stall in this situation (e.g., the displayed video content may freeze for some amount of time).

Once the encoded frame rate and the decoded frame rate have been obtained for the time period (e.g., for one second or for some time period), a check is performed to determine whether there has been a video stall during the time period. The check is performed by comparing the difference between the encoded frame rate and the decoded frame rate to a threshold value. If the difference exceeds the threshold value, then a video stall is determined to have occurred during the time period. Otherwise, if the difference does not exceed the threshold value, then a video stall is determined to have not occurred during the time period.

The following equation, Equation 1, is used in some implementations to determine if a video stall has occurred for a given time period.

$$\text{Stall} = \begin{cases} 1 \text{ if } \Delta_k = (f_k - f_{k+1}) > \theta \\ 0 \text{ if } \Delta_k = (f_k - f_{k+1}) \le \theta \end{cases} \quad \text{Equation 1}$$

If Equation 1 results in the stall being equal to 1 (i.e., true), then a video stall has occurred during the given time period. If Equation 1 results in the stall being equal to 0 (i.e., false) then a video stall did not occur during the given time period. The following terms are used in Equation 1:

$f_{max}$—the frame rate at which the video was encoded (the encoded frame rate)

$f_k$—the frame rate played for a given time period (the decoded frame rate)

$\Delta_k$—the difference between the encoded frame rate $f_{max}$ and the decoded frame rate $f_k$ θ—the threshold value The threshold value can be a default or user-configurable value. In some implementations, the threshold value is set to approximately the minimum number of dropped frames that the user can detect. For example, if the encoded frame rate is 60 frames per second, then then the threshold value could be set to 10 (e.g., 10 dropped frames would be detectable by most users).

To illustrate how Equation 1 operates, consider an example where a client device (e.g., a computing device running a web browser with a video decoder) is receiving streaming video in a bitstream. The streaming video is encoded at an encoded frame rate of 60 frames per second. Over a one-second time period, the decoded frame rate is 48 frames per second. Using Equation 1 (with the threshold value set to 10), the stall would be set to 1 for the one-second time period because the delta would be equal to 12, which is greater than the threshold value of 10, thus indicating a video stall during the one-second time period.

In typical implementations, the number of stalls are counted over some length of time (e.g., over some number of minutes), which is also referred to as a playback interval. The number of stalls can be counted by incrementing a counter over the playback interval. In some implementations, Equation 2 increments a counter named qoeCount for each stall that is detected using Equation 1.

qoeCount=qoeCount+stall  Equation 2

For example, if there are 6 stalls during a five minute playback interval, then qoeCount would be equal to 6. The counter is typically reset for the next playback interval.

Based on determining stalls (e.g., using Equation 1) and counting the number of stalls during a playback interval (e.g., using Equation 2), an overall playback experience rate can be calculated. The overall playback experience rate indicates the average rate of stalls over some playback interval. In some implementations, Equation 3 is used to determine the overall playback experience rate, which is called qoeRate.

$$qoeRate = \frac{qoeCount * 100}{playback\ interval} \quad \text{Equation 3}$$

For example, if the qoeCount is equal to 27 (indicating 27 stalls) during a playback interval of 10 minutes, then qoeRate would be calculated as: (27*100)/(600)=4.5 (indicating a stall rate of 4.5%). While Equation 3 determines the qoeRate as a percentage, other implementations could determine the qoeRate as a fractional value.

Using the qoeRate, the playback experience can be determined during the playback interval (e.g., over the entire playback time period of the steaming video or over a shorter playback interval that is a portion of the entire playback time period). However, in situations where the playback time interval is relatively large, the qoeRate can become very small and it can become difficult to identify shorter time periods where significant stalls occurred. To address this potential issue, additional qoeRates can be determined with shorter time intervals. Two example rates are calculated using Equations 4 and 5 below.

$$qoeRate1M = \frac{qoeCount1M * 100}{60} \quad \text{Equation 4}$$

$$qoeRate15M = \frac{qoeCount15M * 100}{60 * 15} \quad \text{Equation 5}$$

The rate qoeRate1M tracks the stall rate for each one minute playback interval. Specifically, during each one minute playback interval, a new qoeRate1M can be calculated using a qoeCount1M that accumulates stalls during the one minute playback interval (and resets at the beginning of the next one minute playback interval). The rate qoeRate15M tracks the stall rate for each fifteen minute playback interval. Specifically, during each fifteen minute playback interval, a new qoeRate15M can be calculated using a qoeCount15M that accumulates stalls during the fifteen minute playback interval (and resets at the beginning of the next fifteen minute playback interval). Rates can be maintained on time periods in addition to, and/or instead of, one minute or fifteen minute playback intervals.

Categorizing Playback Experience

In the technologies described herein, the playback experience can be categorized based on the qoeRate. Categorization can be performed based on qoeRates for various playback intervals (e.g., qoeRates for overall playback duration, qoeRates relatively short durations such as 5 minutes or 15 minutes, and/or qoeRates for very short durations such as one minute).

In some implementations, categorization is performed using the quality scale depicted in Table 1. These categories can be used for an overall qoeRate (e.g., for the entire playback interval) or based on a shorter interval qoeRate metric (e.g., qoeRate1M or qoeRate15M values). For example, if the qoeRate is calculated to be 4.5, then the playback experience would be categorized as "good."

TABLE 1

| qoeRate | Category |
| --- | --- |
| If qoeRate = 0 | Excellent |
| If 0 < qoeRate <= 0.8 | Very Good |
| If 0.8 < qoeRate <= 8 | Good |
| If 8 < qoeRate <= 16 | Fair |
| If 16 < qoeRate <= 50 | Poor |
| If qoeRate > 50 | Very Bad |

In other implementations, categorization can be determined using different qoeRate values and/or ranges. In addition, a different number of categories and/or category designations can be used. In some implementations, the playback experience is evaluated using a different type of scale (e.g., a numerical scale from 1 to 10) based on qoeRate values.

Environments for Evaluating Quality of Experience

FIG. 1 is a diagram depicting example environment 100 for evaluating video quality of experience based on video frame rates. The example environment 100 includes client 140. Client 140 can be any type of computing device (e.g., server computer, virtual machine, desktop computer, laptop computer, tablet, phone, or another type of computing device) that comprises software and/or hardware resources for determining the quality of experience (QoE) of streaming video that is received and decoded at the client 140. For example, the client 140 can comprise software resources such as a web browser and a video decoder (e.g., integrated with the web browser).

Depicted at 142-148 are example operations that can be performed by the client 140 (e.g., via software running on the client 140). At 142, an encoded video stream is received at the client 140 (e.g., a live video stream, an on-demand video stream, or another type of video stream). At 144, stalls are determined for each of a plurality of time periods during decoding of the encoded video stream received at 142. In some implementations, stalls are determined according to Equation 1. At 146, a QoE rate is calculated based on the stalls determined at 144. In some implementations, the QoE rate is calculated according to Equation 3, 4, and/or 5. At 148, an indication of the QoE rate calculated at 146 is output. For example, the QoE rate can be sent to data collection service 110, as depicted at 135.

The operations depicted at 144-148 can be repeated for each of a plurality of playback intervals, each comprising a respective plurality of time periods). For example, a separate QoE rate can be calculated for each 5 minutes during decoding of the encoded video stream.

In some implementations, the client 140 determines a playback experience category based on the calculated QoE rate. For example, the client 140 can use categories such as those depicted in Table 1. The client 140 can send the QoE rates and/or indications (e.g., categories) for the QoE rates to the data collection service 110.

Depicted at 150 are additional clients, each of which can perform the operations described with respect to client 140. In general, the example environment 100 supports any number of clients, including client 140 and clients 150.

The example environment 100 includes video provider 120. Video provider 120 is a source of the encoded video stream that is received by client 140 (and/or by other clients, such has clients 150), as depicted at 122. For example, video provider 120 transmits the encoded video stream to client 140 (and/or clients 150) via a computer network 132 (e.g., comprising the Internet), as depicted at 130. Video provider 120 can be implemented by various software resources (e.g., video encoding resources and/or video transcoding resources) and/or hardware resources (e.g., server hardware, cloud computing resources, etc.). In some implementations, video provider 120 acts as an intermediary in providing the encoded video streams (e.g., video provider 120 can be part of a content distribution network (CDN)). In general, the example environment 110 can include any number of video providers.

The example environment 100 includes data collection service 110. Data collection service 110 can be implemented by various software resources (e.g., database software, data visualization tools, etc.) and/or hardware resources (e.g., server hardware, data storage resources, cloud computing resources, etc.). Data collection service 110 receives indications of QoE rates (e.g., the QoE rates themselves and/or category information derived from the QoE rates) from any number of clients (e.g., from client 140 and/or clients 150). Typically, the data collection service 110 receives QoE rate information from many clients over various playback intervals, which allows the data collection service 110 to generate QoE statistics (e.g., for reporting or visualization) and perform automated operations (e.g., if a significant number of clients are experiencing quality below a threshold value). In some implementations, data collection service 110 performs one or more of the operations depicted at 112-118. For example, at 112, data collection service 110 receives QoE rate information (e.g., QoE rates and/or categories) from a plurality of clients (e.g., from client 140 and/or from clients 150). At 114, data collection service 110 stores the received rate information. If needed, data collection service 110 can perform additional processing before and/or after storing the rate information. For example, if data collection service 110 receives the QoE rates as numerical values (e.g., as the percentages generated by Equation 3), then the QoE rate values can be converted to playback experience categories and stored. The QoE rate information can be stored in a data store such that it can be retrieved (e.g., queried).

As depicted at 116, the data collection service 110 can provide data visualization tools for accessing the QoE rate information. For example, a user or automated process can query the saved QoE rate information to generate visualizations, reports, etc. In some implementations, a data visualization tool allows the user to view a graph depicting, for each of a number of playback intervals, how many clients have QoE rates in each of a number of categories (e.g., how many clients have excellent quality rates, how many clients have very good quality rates, how many clients have good quality rates, how many clients have fair quality rates, and so on). Various types of additional data analysis can be performed based on the stored QoE rate information (e.g., aggregated QoE rate information). For example, QoE rate information can be obtained and/or visualized for clients in different regions (e.g., different geographical regions, such as different countries), for clients viewing different video streams (e.g., for different streaming events), etc.

As depicted at 118, the data collection service 110 can perform automated operations based on the QoE rate information. In some implementations, the automated operations comprise initiating automated adjustments of the encoded video streams. For example, if a problem is detected with the streaming video based on the QoE rate information, then the data collection service 110 can initiate a restart of one or more video pipeline components. For example, the data collection service 110 can send a command to a video pipeline component (e.g., a video encoding service, a video transcoding service, etc.) to restart. In some implementations, the data collection service 110 sends a command to video provider 120 to perform the restart (e.g., to restart one or more video pipeline components running at, or associated with, the video provider 120). A problem can be detected by comparing the QoE rate information to various thresholds. For example, if more than a threshold number of clients are experiencing QoE rates below a certain quality (e.g., below good quality), then an automated adjustment can be performed. Other automated action can also be taken based on the QoE rate information. For example, an alert can be generated based on QoE rate information (e.g., email alerts, text message alerts, dashboard alerts, etc.).

In some implementations, QoE rate information is used to test new features. For example, if a new feature is deployed to streaming clients (e.g., a modification to a video decoder, a new video decoder, networking modifications, video streaming pipeline changes, etc.), then a comparison can be made between QoE rate information obtained before the change and QoE rate information obtained after the change (e.g., using the same streaming video content).

In some implementations, QoE rate information is used for quality monitoring. For example, QoE rate information can be obtained from a number of clients over various playback intervals. Using the QoE rate information, the quality of the playback experience can be monitored (e.g., using a dashboard to visually depict monitoring statistics).

In some implementations, the technologies for determining QoE rate information can be applied to other stages of the video processing pipeline. For example, QoE rate information can be determined during transcoding of the video content. Transcoding can occur at various locations during video processing (e.g., at a content distribution network, at a cloud server, at video provider 120, etc.). During transcoding, stalls can be determined for each of a plurality of time periods, QoE rates can be calculated, and QoE rate information can be output (e.g., sent to data collection service 110). Generally, the operations performed during transcoding are very similar to the operations performed by the client 140 at 142-148, with the difference being that they are performed during transcoding and not during decoding. The QoE rate information obtained from other stages of the video processing pipeline can be also used to perform automated operations and/or for performing data visualization and analysis.

Example Categorization Algorithm

In the technologies described herein, the playback experience can be categorized based on the qoeRate. Categorization can be performed based on qoeRates for various playback intervals (e.g., qoeRates for an overall playback duration, qoeRates relatively short durations such as 5 minutes or 15 minutes, and/or qoeRates for very short durations such as one minute).

Figure 2:
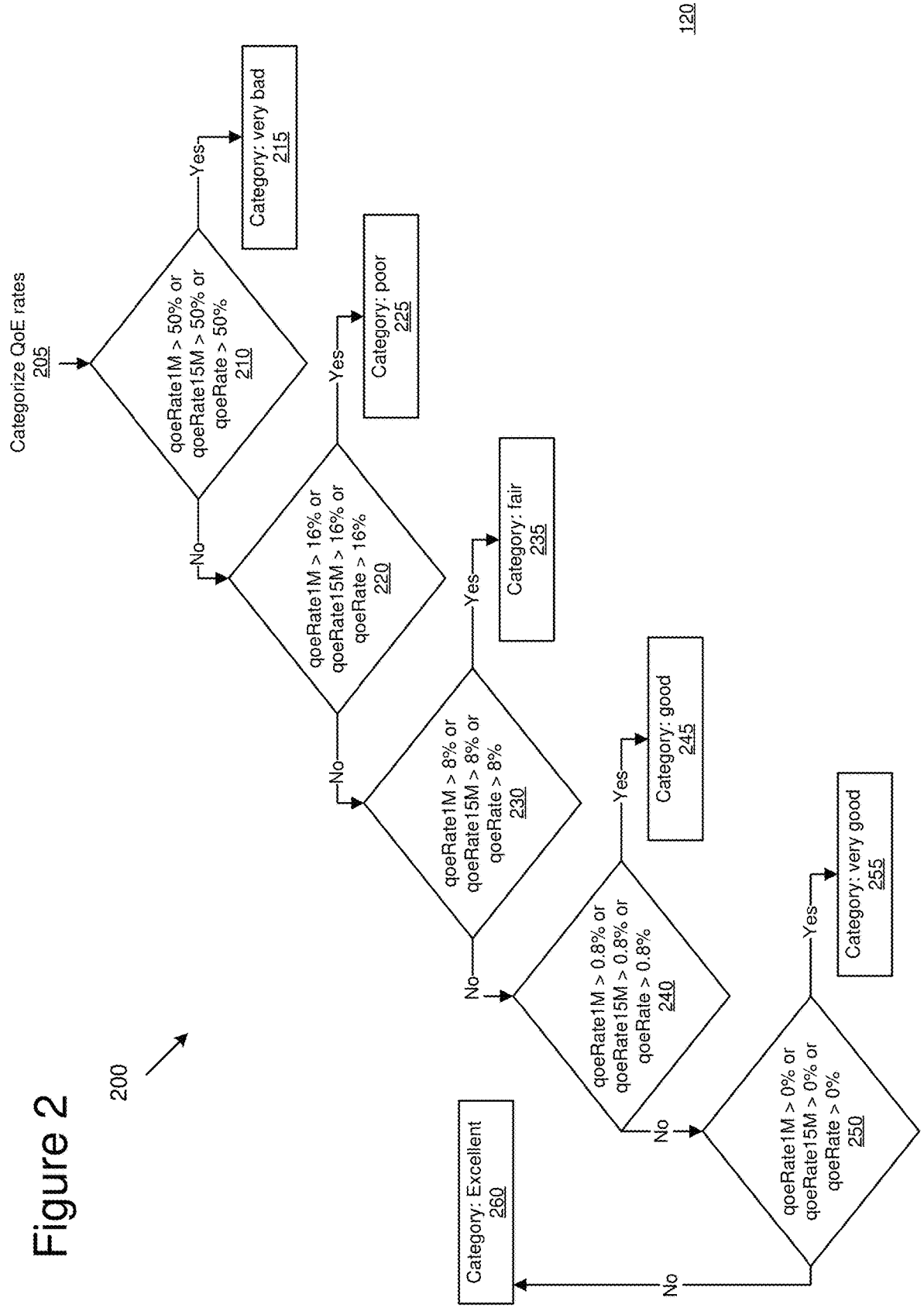
FIG. 2 is a diagram depicting an example flowchart for determining playback experience categories using QoE rates.

FIG. 2 is a diagram depicting an example algorithm 200 for determining playback experience categories based on QoE rates. The example algorithm 200 can be performed for each of a plurality of clients and for each of a plurality of playback intervals. For example, the example algorithm 200 can be used to determine a category for each one minute playback interval for each client using the most recently calculated QoE rate information for each client. In the example algorithm 200, there are three QoE rates that are considered. First, qoeRate indicates the rate of stalls since playback of the encoded video stream began for a given client. Second, qoeRate1M indicates the rate of stalls during the last one minute for a given client. Third, qoeRate15M indicates the rate of stalls during the last 15 minutes for a given client. In other implementations, different QoE rates can be considered (e.g., a different number of QoE rates and/or QoE rates covering different playback intervals).

At 205, the algorithm begins the process of determining a category for an input set of QoE rates for a given client. For example, the three QoE rates could be calculated using Equations 3, 4, and 5. At 210, each of the three QoE rates (qoeRate1M, qoeRate15M, and qoeRate) are evaluated. If any of the three QoE rates is greater than 50%, then the category is determined to be "very bad," as indicated at 215. This means that if the client has experienced stalls above this rate during either the last minute, the last 15 minutes, or since playback began, this category would be determined for the client for the current playback interval. Otherwise, the algorithm proceeds to the next evaluation stage at 220. At 220, if any of the three QoE rates are above 16%, then the category is determined to be "poor," as indicated at 225. Otherwise, the algorithm proceeds to the next evaluation stage at 230. At 230, if any of the three QoE rates are above 8%, then the category is determined to be "fair," as indicated at 235. Otherwise, the algorithm proceeds to the next evaluation stage at 240. At 240, if any of the three QoE rates are above 0.8%, then the category is determined to be "good," as indicated at 245. Otherwise, the algorithm proceeds to the next evaluation stage at 250. At 250, if any of the three QoE rates are above 0%, then the category is determined to be "very good," as indicated at 255. Otherwise (i.e., the rate is equal to 0% for the three QoE rates), then the category is determined to be "excellent," as indicated at 260. The threshold values used for the three QoE rates are example values, and different implementations can use different threshold values (e.g., other than 50% for the first QoE stage depicted at 210). In addition, different threshold values could be used for different playback interval durations (e.g., the overall qoeRate could use a first threshold value, the shorter duration qoeRate15M could use a second threshold value, and the shortest duration qoeRate1M could use a third threshold value).

Methods for Determining QoE Rates During Video Decoding

In any of the examples herein, methods can be provided for determining QoE rates during video decoding based on video stalls.

Figure 3:
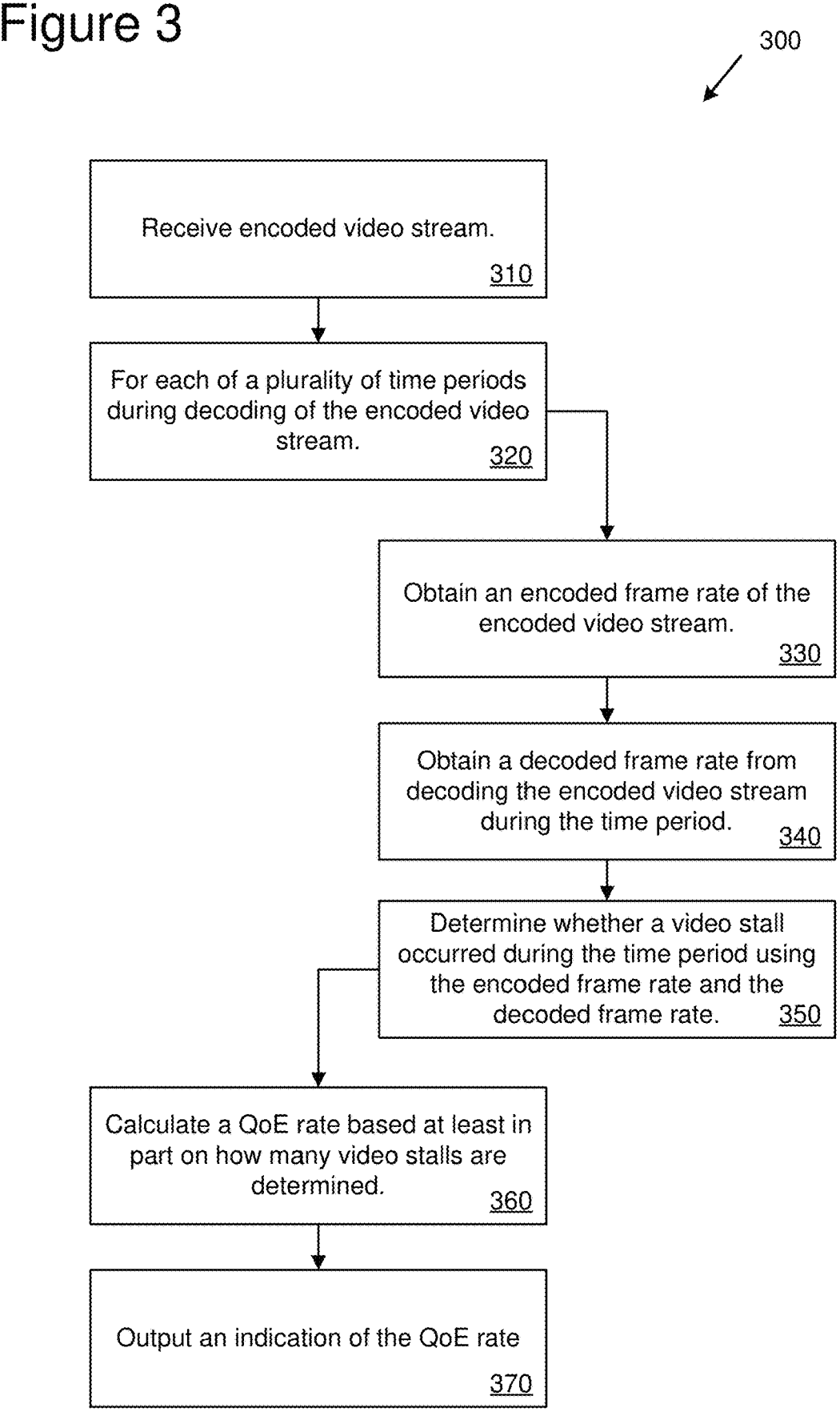
FIG. 3 is a flowchart of an example method for determining QoE rates during video decoding.

FIG. 3 is a is a flowchart of an example method 300 for determining QoE rates during video decoding. For example, the example method 300 can be performed by a client, such as client 140.

At 310, an encoded video stream is received. The encoded video stream comprises video content encoded according to a video coding specification.

At 320, a number of operations are performed for each of a plurality of time periods during decoding of the encoded video stream. At 330, an encoded frame rate of the encoded video stream is obtained. At 340, a decoded frame rate from decoding the encoded video stream during the time period is obtained. At 350, the encoded frame rate and the decoded frame rate are used to determine whether a video stall occurred during the time period. For example, the determination can be made using Equation 1.

At 360, a QoE rate is calculated based at least in part on how many video stalls were determined over the plurality of time periods. For example, each time period could be one second, with the plurality of time period covering 60 seconds. In this case, the QoE rate would be calculated using the number of video stalls that occurred during the 60 second playback interval (which contains 60 one-second time periods). In some implementations, the QoE rate is calculated according to Equation 3, 4, or 5.

At 370, an indication of the QoE rate is output. The indication of the QoE rate can be the numerical QoE rate (e.g., as a fractional value or percentage) or a representation of the numerical QoE rate (e.g., a playback experience category derived from the numerical QoE rate). The indication of the QoE rate can be saved, sent to an external service (e.g., to data collection service 110), or output in another manner.

Figure 4:
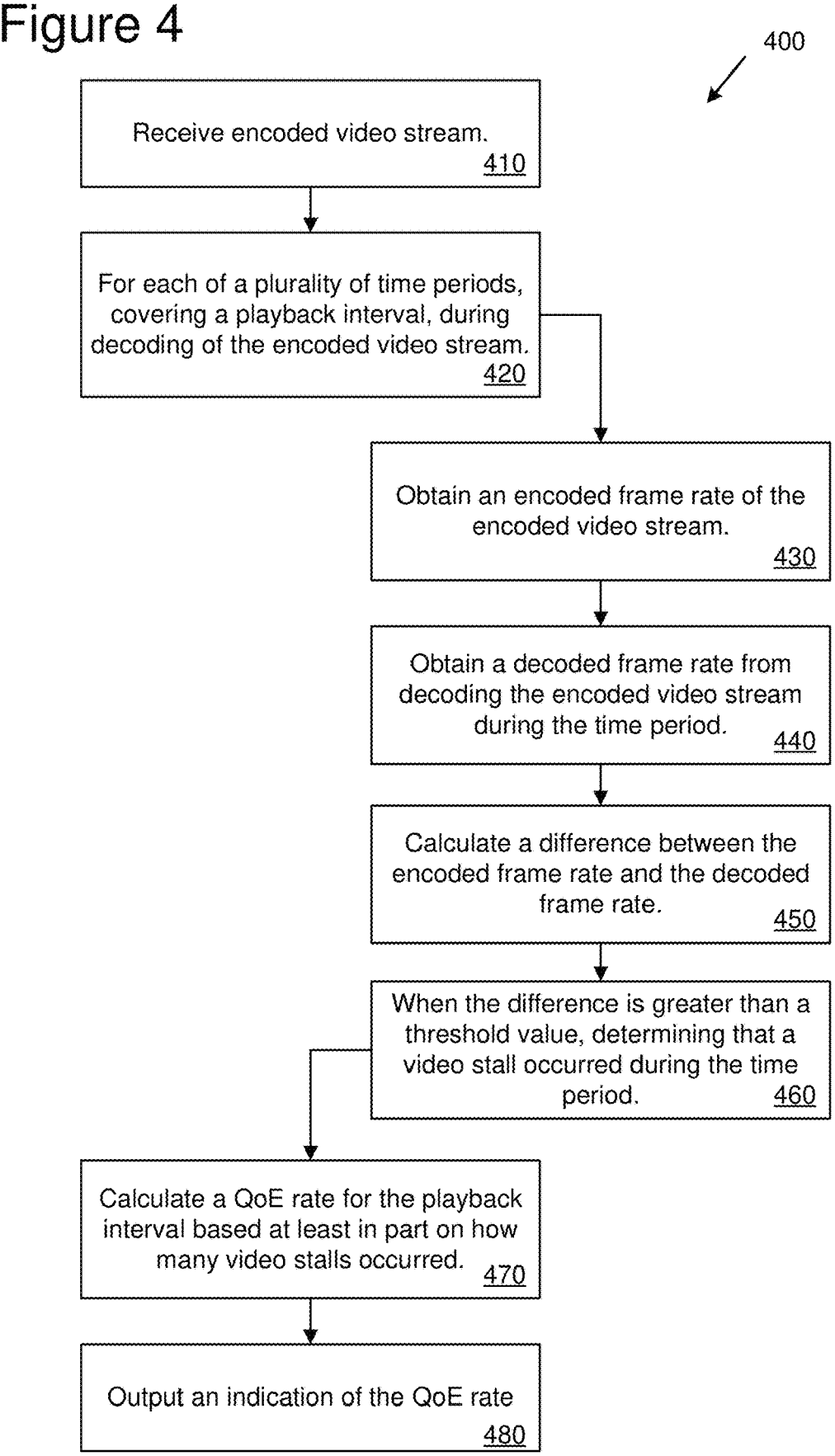
FIG. 4 is a flowchart of an example method for determining QoE rates for playback intervals during video decoding.

FIG. 4 is a is a flowchart of an example method 400 for determining QoE rates for playback intervals during video decoding. For example, the example method 400 can be performed by a client, such as client 140.

At 410, an encoded video stream is received. The encoded video stream comprises video content encoded according to a video coding specification.

At 420, a number of operations are performed for each of a plurality of time periods, covering a playback interval, during decoding of the encoded video stream. At 430, an encoded frame rate of the encoded video stream is obtained. At 440, a decoded frame rate from decoding the encoded video stream during the time period is obtained. At 450, a difference is calculated between the encoded frame rate and the decoded frame rate obtained during the time period (e.g., calculating $d_k$). At 460, when the difference is greater than a threshold value, then a video stall is determined to have occurred during the time period. For example, the determination can be made using Equation 1.

At 470, a QoE rate is calculated for the playback interval based at least in part on how many video stalls were determined to have occurred during the playback interval. For example, if the playback interval is 15 minutes in duration, and each time period is one second in duration, then the operations depicted at 430-460 would be performed 900 times.

At 480, an indication of the QoE rate is output. The indication of the QoE rate can be the numerical QoE rate (e.g., as a fractional value or percentage) or a representation of the numerical QoE rate (e.g., a playback experience category derived from the numerical QoE rate). The indication of the QoE rate can be saved, sent to an external service (e.g., to data collection service 110), or output in another manner.

Figure 5:
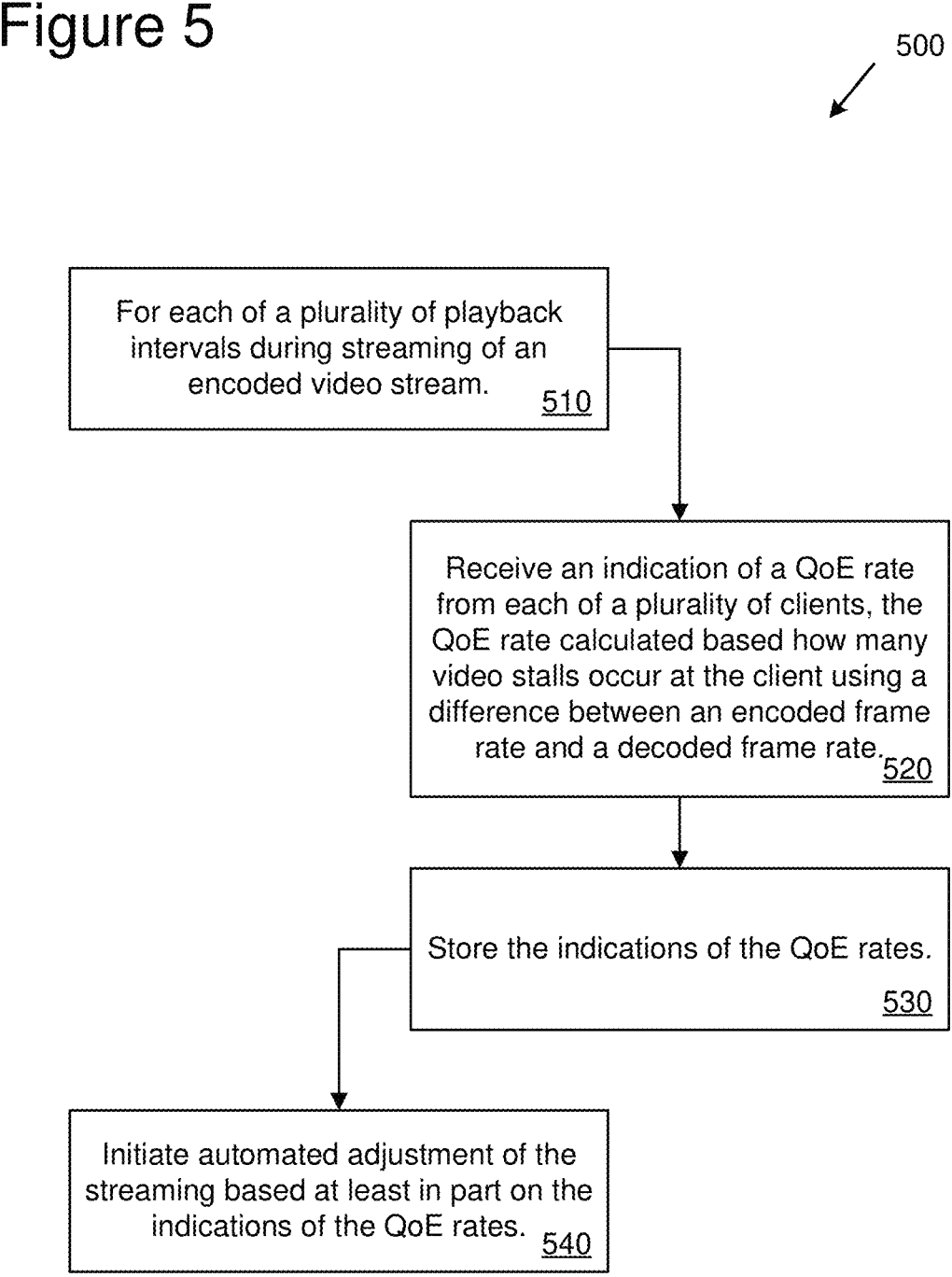
FIG. 5 is a flowchart of an example method for receiving QoE rates from clients based on video stalls.

FIG. 5 is a is a flowchart of an example method 500 for receiving QoE rates from clients based on video stalls during streaming of an encoded video stream. For example, the example method 500 can be performed by a service running on a server or cloud resources, such as data collection service 110.

At 510, a number of operations are performed for each of a plurality of playback intervals during streaming of an encoded video stream. The encoded video stream is being streamed to a plurality of clients (e.g., client devices running video decoding software). At 520, an indication of a QoE rate is received from each of a plurality of clients. The QoE rate is calculated based on how many video stalls occur at the client during the playback interval. A video stall is determined using a difference between an encoded frame rate and a decoded framerate (e.g., from the video decoder running at the client). At 530, the indications of the QoE rates are stored. In some implementations, the indications are stored as numerical QoE values. In some implementations, at least some of the QoE rates are received and stored as playback experience categories.

At 530, an automated adjustment is initiated based at least in part of the indications of the QoE rates. For example, one or more video pipeline components associated with streaming the encoded video stream can be restarted (e.g., encoder components, transcoding components, network components, etc.). The automated adjustment can be initiated based on trends present in the QoE rates. For example, QoE rates may vary over the plurality of playback intervals (e.g., each minute, each five minutes, etc.). If the QoE rates indicate a problem with streaming the encoded video stream (e.g., if many clients report QoE rates with quality below a threshold), then automated action can be taken (e.g., to restart video pipeline components).

Computing Systems

Figure 6:
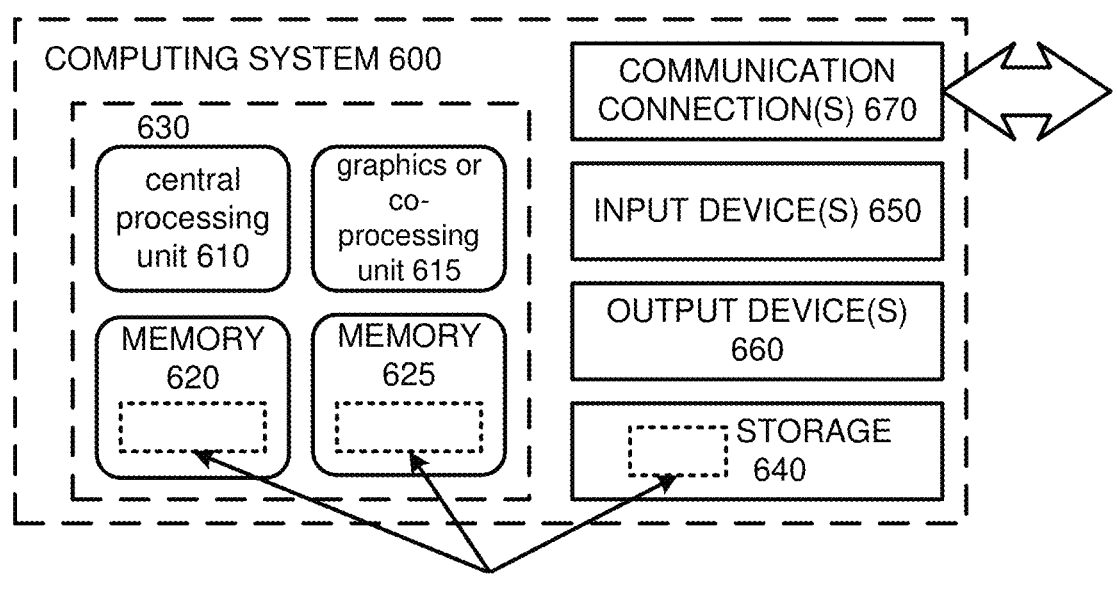
FIG. 6 is a diagram of an example computing system in which some described embodiments can be implemented.

FIG. 6 depicts a generalized example of a suitable computing system 600 in which the described technologies may be implemented. The computing system 600 is not intended to suggest any limitation as to scope of use or functionality, as the technologies may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more technologies described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more technologies described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Cloud-Supported Environment

Figure 7:
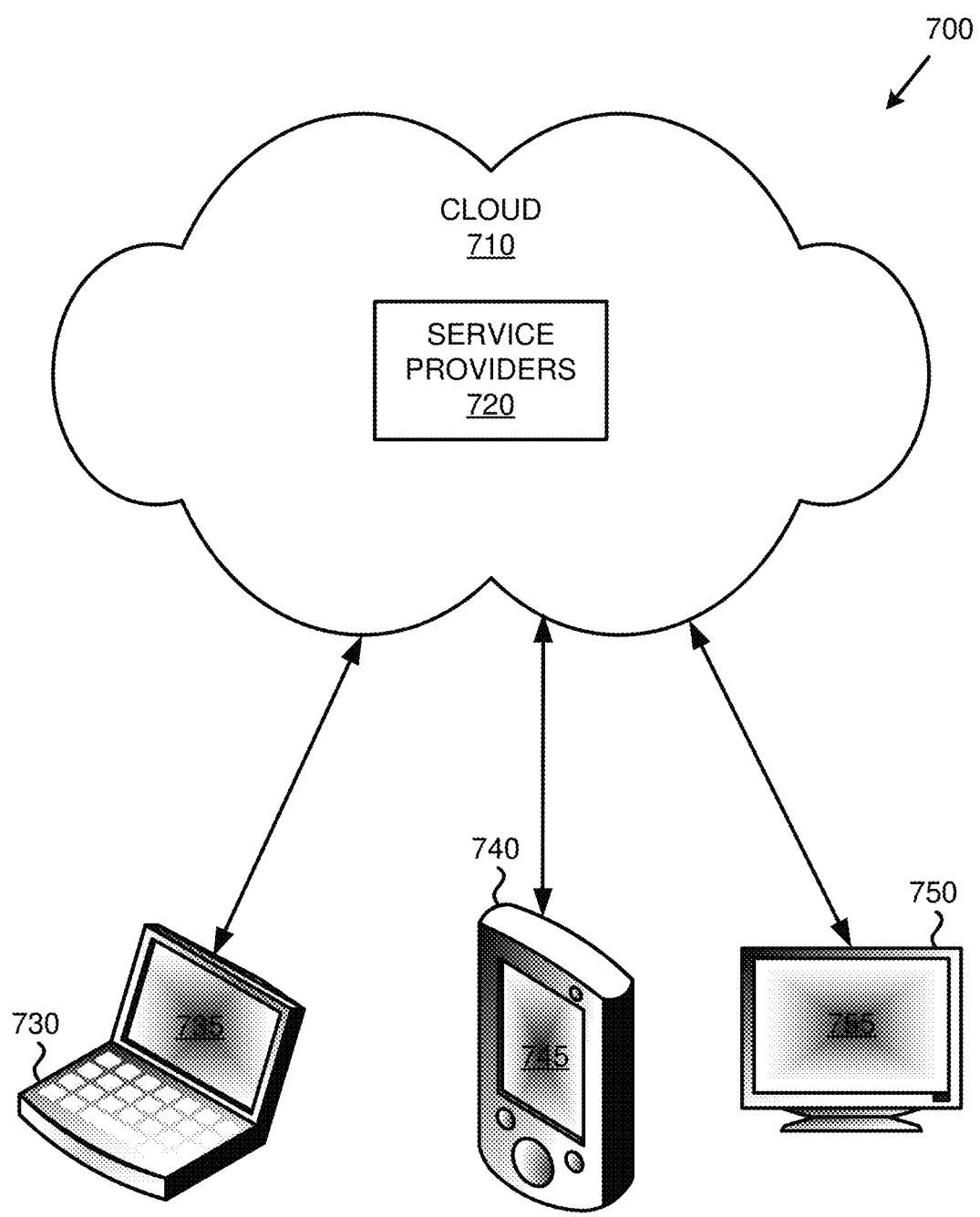
FIG. 7 is an example cloud-support environment that can be used in conjunction with the technologies described herein.

FIG. 7 illustrates a generalized example of a suitable cloud-supported environment 700 in which described embodiments, techniques, and technologies may be implemented. In the example environment 700, various types of services (e.g., computing services) are provided by a cloud 710. For example, the cloud 710 can comprise a collection of computing devices, which may be located centrally or distributed, that provide cloud-based services to various types of users and devices connected via a network such as the Internet. The implementation environment 700 can be used in different ways to accomplish computing tasks. For example, some tasks (e.g., processing user input and presenting a user interface) can be performed on local computing devices (e.g., connected devices 730, 740, 750) while other tasks (e.g., storage of data to be used in subsequent processing) can be performed in the cloud 710.

In example environment 700, the cloud 710 provides services for connected devices 730, 740, 750 with a variety of screen capabilities. Connected device 730 represents a device with a computer screen 735 (e.g., a mid-size screen). For example, connected device 730 could be a personal computer such as desktop computer, laptop, notebook, netbook, or the like. Connected device 740 represents a device with a mobile device screen 745 (e.g., a small size screen). For example, connected device 740 could be a mobile phone, smart phone, personal digital assistant, tablet computer, and the like. Connected device 750 represents a device with a large screen 755. For example, connected device 750 could be a television screen (e.g., a smart television) or another device connected to a television (e.g., a set-top box or gaming console) or the like. One or more of the connected devices 730, 740, 750 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 700. For example, the cloud 710 can provide services for one or more computers (e.g., server computers) without displays.

Services can be provided by the cloud 710 through service providers 720, or through other providers of online services (not depicted). For example, cloud services can be customized to the screen size, display capability, and/or touchscreen capability of a particular connected device (e.g., connected devices 730, 740, 750).

In example environment 700, the cloud 710 provides the technologies and solutions described herein to the various connected devices 730, 740, 750 using, at least in part, the service providers 720. For example, the service providers 720 can provide a centralized solution for various cloud-based services. The service providers 720 can manage service subscriptions for users and/or devices (e.g., for the connected devices 730, 740, 750 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. The term computer-readable storage media does not include signals and carrier waves. In addition, the term computer-readable storage media does not include communication connections, such as 670.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device comprising:
   a processor;
   a network interface; and
   memory;
   the computing device configured to perform operations for determining quality of experience (QoE) rates during video decoding, the operations comprising:
      receiving an encoded video stream comprising video content encoded according to a video coding specification;

for each of a plurality of time periods during decoding of the encoded video stream:
    obtaining an encoded frame rate of the encoded video stream;
    obtaining a decoded frame rate from decoding the encoded video stream during the time period, wherein the decoded frame rate is a number of frames of the encoded video content that are successfully decoded, and available for playback, by a video decoder running on the computing device during the time period; and
    determining whether there is a video stall during the time period based at least in part on the encoded frame rate in comparison to the decoded frame rate, wherein determining whether there is a video stall during the time period based at least in part on the encoded frame rate in comparison to the decoded frame rate comprises:
        if a difference between the encoded frame rate and the decoded frame rate is greater than a threshold value, determining that there is a video stall during the time period; and
        otherwise, determining that there is no video stall during the time period;
    calculating a QoE rate based at least in part on how many video stalls are determined over the plurality of time periods; and
    outputting an indication of the QoE rate.

2. The computing device of claim 1, wherein the QoE rate is calculated to be a ratio of a total of the video stalls determined over the plurality of time periods to a playback interval equal to the plurality of time periods.

3. The computing device of claim 1, wherein calculating the QoE rate based at least in part how many video stalls are determined over the plurality of time periods comprises:
    accumulating a QoE count that totals the number of video stalls determined during the plurality of time periods; and
    dividing the QoE count by a playback interval, equal to the plurality of time periods, to determine the QoE rate.

4. The computing device of claim 1, the operations further comprising:
    calculating one or more additional QoE rates each covering a different plurality of time periods; and
    outputting indications of the one or more additional QoE rates.

5. The computing device of claim 1, the operations further comprising:
    determining a playback experience category for the QoE rate;
    wherein outputting the indication of the QoE rate comprises outputting the playback experience category.

6. The computing device of claim 1, wherein each time period, of the plurality of time periods, is one second in duration.

7. The computing device of claim 1, wherein outputting the indication of the QoE rate comprises:
    sending the indication of the QoE rate to a data collection service;
    wherein the data collection service uses the indication of the QoE rate, at least in part, to initiate an automated adjustment of the encoded video stream.

8. The computing device of claim 1, wherein the determining whether there is a video stall during the time period is performed using only the encoded frame rate and the decoded frame rate.

9. A method, implemented by a computing device, for determining quality of experience (QoE) rates during video decoding, the method comprising:
    receiving an encoded video stream comprising video content encoded according to a video coding specification;
    for each of a plurality of time periods, covering a first playback interval, during decoding of the encoded video stream by a video decoder running on the computing device:
        obtaining an encoded frame rate of the encoded video stream;
        obtaining a decoded frame rate from decoding the encoded video stream during the time period, wherein the decoded frame rate is produced by the video decoder, and wherein the decoded frame rate is a number of frames of the encoded video content that are successfully decoded, and available for playback, by the video decoder running on the computing device during the time period;
        calculating a difference between the encoded frame rate and the decoded frame rate;
        when the difference between the encoded frame rate and the decoded frame rate is greater than a threshold value, determining that there is a video stall during the time period; and
        otherwise, determining that there is no video stall during the time period:
    calculating a QoE rate for the first playback interval based at least in part on how many video stalls are determined during the first playback interval; and
    outputting an indication of the QoE rate.

10. The method of claim 9, wherein the QoE rate is calculated to be a ratio of a total of the video stalls determined during the first playback interval equal to the first playback interval.

11. The method of claim 9, further comprising:
    determining a playback experience category for the QoE rate;
    wherein outputting the indication of the QoE rate comprises outputting the playback experience category.

12. The method of claim 9, further comprising:
    calculating one or more additional QoE rates each covering one or more additional playback intervals; and
    outputting indications of the one or more additional QoE rates.

13. The method of claim 9, wherein outputting the indication of the QoE rate comprises:
    sending the indication of the QoE rate to a data collection service;
    wherein the data collection service uses the indication of the QoE rate, at least in part, to perform an automated adjustment of the encoded video stream.

14. The method of claim 9, wherein the determining whether there is a video stall during the time period is performed using only the encoded frame rate and the decoded frame rate.

15. A method, implemented by a computing device, for determining quality of experience (QoE) rates during video decoding, the method comprising:
    for each of a plurality of playback intervals during streaming of an encoded video stream comprising video content encoded according to a video coding specification:
        receiving, from each of a plurality of client devices, an indication of a QoE rate for the playback interval indicating playback quality from decoding the encoded video stream at the client device, wherein the QoE rate is calculated at the client device based on how many video stalls occur at the client device during decoding, wherein a video stall is determined based at least in part on a difference between an encoded frame rate of the encoded video stream and a decoded frame rate generated by a decoder during decoding the encoded video stream at the client device, wherein the decoded frame rate is a number of frames of the encoded video content that are successfully decoded, and available for playback, by a video decoder running on the client device during a time period, and wherein determining whether there is a video stall comprises:
   if a difference between the encoded frame rate and the decoded frame rate is greater than a threshold value, determining that there is a video stall during the time period; and
   otherwise, determining that there is no video stall during the time period; and
storing the indications of the QoE rates received from each of the plurality of client devices;
based at least in part on the indications of the QoE rates, initiating an automated adjustment of the streaming of the encoded video stream.

16. The method of claim 15 wherein the automated adjustment comprises restarting one or more video pipeline components associated with the streaming of the encoded video stream.

17. The method of claim 15, further comprising, for each of the plurality of playback intervals:
   determining a playback experience category for each of the received indications of QoE rates;
   wherein storing the indications of the QoE rates comprises storing the playback experience categories.

18. The method of claim 15 wherein at least a portion of the indications of the QoE rates comprise playback experience categories.

19. The method of claim 15 wherein the stall is determined at the client device using only the encoded frame rate, the decoded frame rate, and a time period during which the decoded frame rate is measured.

* * * * *